T. J. KEHOE.
UNIVERSAL JOINT.
APPLICATION FILED MAY 23, 1917.
1,335,740.
Patented Apr. 6, 1920.
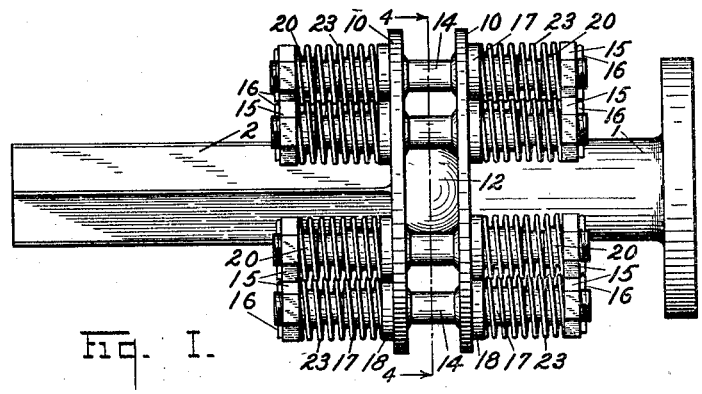
Fig. I.
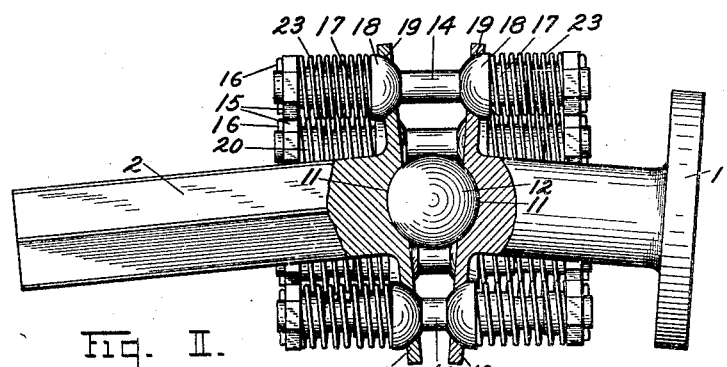
Fig. II.
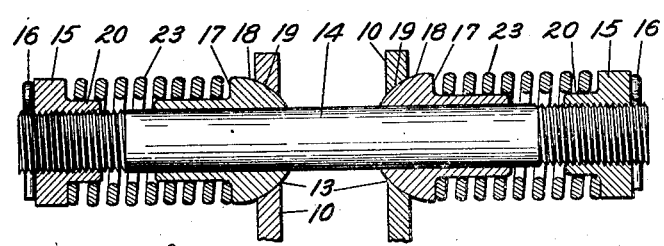
Fig. III.
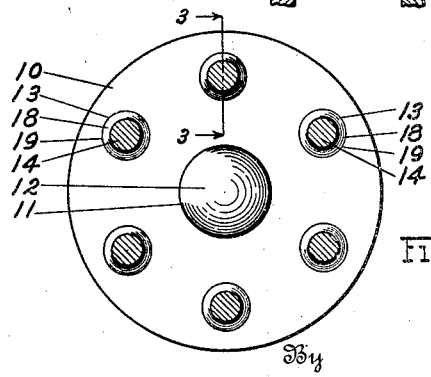
Fig. IV.
Inventor
Thomas J. Kehoe
By Chester W. Broxelton
Attorney

UNITED STATES PATENT OFFICE.

THOMAS J. KEHOE, OF TOLEDO, OHIO, ASSIGNOR TO THE WILLYS-OVERLAND COMPANY, OF TOLEDO, OHIO.

UNIVERSAL JOINT.

1,335,740. Specification of Letters Patent. Patented Apr. 6, 1920.

Application filed May 23, 1917. Serial No. 170,471.

*To all whom it may concern:*

Be it known that I, THOMAS J. KEHOE, a citizen of the United States, residing at Toledo, in the county of Lucas and State of Ohio, have invented certain new and useful Improvements in Universal Joints, of which I declare the following to be a full, clear, and exact description.

This invention relates to improvements in universal joints for use in connecting two shafts or shaft sections to permit movement of the shaft sections out of axial alinement while allowing perfect freedom to the parts in their rotating movement.

The main object of this invention is to provide a universal joint which will tend to retain the shaft sections in axial alinement and will transmit the driving torque from one section to the other, while permitting movement of the shaft sections out of axial alinement with a minimum amount of wear on the parts.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a side elevation of the universal joint embodying the present invention.

Fig. II is a transverse sectional view taken through the universal joint and showing the shaft sections out of axial alinement.

Fig. III is an enlarged transverse detail section taken on the line III—III of Fig. IV; and, Fig. IV is a cross section taken on the line IV—IV of Fig. I.

Referring to the drawings, 1 and 2 designate the shafts or shaft sections connected by the universal joint. This invention finds ready application in many situations in which a driving connection is to be effected between two shafts or shaft sections, and said sections must be allowed perfect freedom of movement into and out of axial alinement. The device is especially adapted for use in motor vehicles in which, since the motor is usually resiliently mounted with reference to the driving axle, a universal joint connection is necessary between the sections of the shaft transmitting the power from the motor to the axle.

The shaft sections 1 and 2 are provided, upon their adjacent ends, with circular plates or disks 10. These disks are preferably integral with the shaft sections, but may be separate disks fastened thereto. Mounted between the adjacent ends of the shaft sections, and seated in hemispherical seats 11 in the centers of disks 10, is a ball 12 which acts as a bearing about which the shafts turn when moved out of alinement. Each disk 10 has a plurality of holes or openings 13 equidistant from the center of the disk and equidistant from each other. The openings 13 in the two disks 10 are in alinement and projecting through the openings 13 in both disks are bolts 14 which are threaded on both ends. Screwed on each end of each bolt is a nut 15 which is locked on the bolt by a cotter pin 16. Loosely mounted on the bolts 14 between the nuts 15 and the disks 10 are sleeves 17. The ends of the sleeves 17 which project into the openings 13 in the disks 10 are enlarged to form hemispherical bearing surfaces 18 and the openings 13 are concave in cross section to form hemispherical seats 19 for the bearing surfaces 18. The nuts 15 have projecting flanges 20 and coiled springs 23 are mounted on the bolts 14, and are compressed between the flanges 20 of nuts 15 and the enlarged ends of the sleeves 17. It is evident that the number of bolts 14 may be varied as desired and six bolts are here shown merely for illustrative purposes.

From the above description it will be seen that the springs 23 tend to force the two sleeves 17 on each bolt 14 toward each other and therefore yieldingly seat the bearing surfaces at the enlarged ends of the sleeves in the seats 19 in the disks 10. All of the springs 23 are tensioned substantially alike and therefore they tend to keep the disks 10 parallel and the shaft sections in axial alinement. The tension of the springs may be varied by adjusting the nuts 15. When the shaft sections move out of axial alinement, they turn on the ball 12 and at the same time, the disks on one side of the ball 12 are moved closer together and on the other side farther apart. In Fig. II it will be seen that the sleeves on the bolt at the top are farther separated from each other and the compression of the springs is greater than at the bottom, where the sleeves are closer together on the bolt 14.

I have found that the embodiment of my invention here shown and described is desirable from many standpoints, but I am well aware that it may be varied considerably without departing from the spirit of my invention and, therefore, I desire to claim my invention specifically and broadly as indicated by the appended claims.

Having thus described my invention what I desire to secure by Letters Patent is:

1. A universal joint comprising a drive shaft, a driven shaft, a disk carried by the adjacent ends of each of said shafts, a centrally disposed bearing for holding said shafts in spaced relation, a plurality of bolts extending loosely through said disks, springs carried by the ends of said bolts having their inner ends supported by said disks in a manner to effect expansion of one set of springs and contraction of the opposite set when said shafts are moved out of alinement.

2. A universal joint comprising a drive shaft, a driven shaft, disks carried by the adjacent ends of said shafts, a ball seated in recesses formed in the adjacent shaft ends, bolts extended through said disks and projecting on opposite sides thereof, sleeves upon said bolts having hemispherical heads seated in correspondingly shaped recesses upon the outer faces of said disks, said heads being held in spaced relation by said disks, and springs upon the ends of said bolts in engagement with said sleeves.

3. A universal joint comprising a drive shaft, a driven shaft, transverse members on the adjacent ends of said shafts, a centrally disposed spacing member between said adjacent shaft ends, and yieldable means upon said transverse members adapted to constantly urge the shafts toward each other.

4. A universal joint comprising a drive shaft, a driven shaft, transverse members on the adjacent ends of said shafts, yieldable means connecting said transverse members adapted to constantly urge said shafts toward each other, and a ball interposed between the ends of said shafts for separating said transverse members and centralizing the pressure exerted by said yieldable means directly in line with the longitudinal axes of said shafts.

5. A universal joint comprising two spaced members, a centrally disposed bearing for holding said members apart, said bearing forming a pivot about which said members are adapted to rotate, and yieldable means constantly urging said members upon said bearing.

6. A universal joint comprising two spaced shafts, a centrally disposed bearing for holding said shafts apart, said bearing forming a pivot about which the shafts are adapted to rotate, and a plurality of yieldable connections between the shafts constantly urging them toward each other and adapted to retain the same in proper position upon said bearing.

7. A universal joint comprising two spaced members having curved recesses in their adjacent ends, a ball seated in said recesses and adapted to hold said members in spaced relation, and yieldable means connecting said members and constantly urging them toward each other.

8. A universal joint comprising two spaced members having laterally extending portions thereon, a bearing between said members upon which the members are adapted to rotate, said bearing serving to hold said members apart, bolts projecting through the laterally extending portions of said members, sleeves slidably mounted upon said bolts having curved portions seated in correspondingly curved recesses formed in the laterally extending portions of said members, and springs upon the outer ends of said bolts constantly urging said members toward each other and upon said bearing.

9. A universal joint comprising a drive shaft, a driven shaft, a bearing between the ends of said shafts at the center thereof permitting said ends to move nearer to each other when the shafts are moved from a normally alined position to a position at an angle to each other, and yieldable means constantly urging said shafts toward each other.

In testimony whereof I affix my signature.

THOMAS J. KEHOE.